E. A. BERRY.
BATTERY COVER.
APPLICATION FILED APR. 21, 1922.
1,419,208.
Patented June 13, 1922.
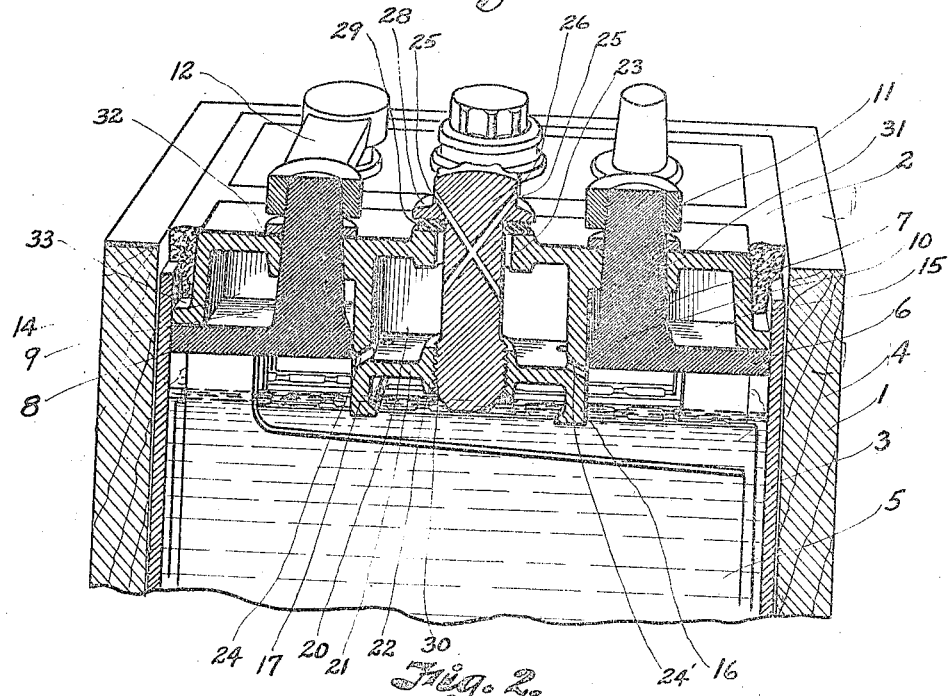
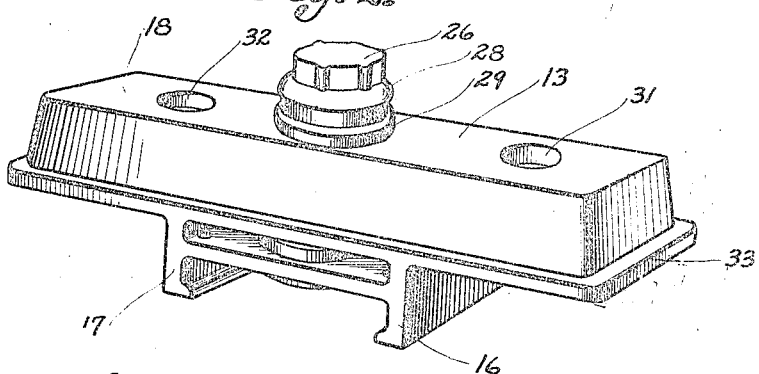
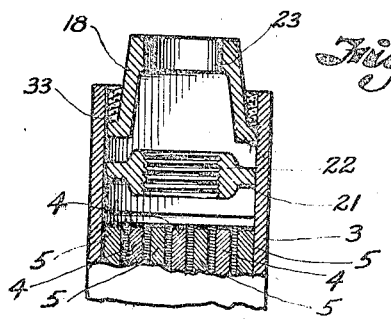
INVENTOR
Earle A. Berry.
BY Arthur C. Brown
ATTORNEY

UNITED STATES PATENT OFFICE.

EARLE A. BERRY, OF KANSAS CITY, MISSOURI.

BATTERY COVER.

1,419,208.   Specification of Letters Patent.   Patented June 13, 1922.

Application filed April 21, 1922. Serial No. 555,889.

*To all whom it may concern:*

Be it known that I, EARLE A. BERRY, a citizen of the United States, residing at Kansas City, in the county of Jackson and State of Missouri, have invented certain new and useful Improvements in Battery Covers; and I do declare the following to be a full, clear, and exact description of the invention, such as will enable others skilled in the art to which it appertains to make and use the same; reference being had to the accompanying drawings, and to the figures of reference marked thereon, which form a part of this specification.

This invention relates to cell covers for storage batteries and one of the objects thereof is to provide a combined cell cover, filler tube, gas relief means and separator guard for storage batteries, which may be inexpensively constructed, conveniently applied and which will possess certain inherent advantages over known types of storage battery cell covers.

The invention consists in certain novel details of construction and arrangements of parts, all of which will be specifically described hereinafter, reference being had to the accompanying drawings, in which Fig. 1 is a vertical, longitudinal, sectional view through the upper portion of a storage battery cell to which my invention is applied.

Fig. 2 is a detail perspective view of the cell cover, and

Fig. 3 is a cross sectional view through the cell showing the filler tube plug removed.

The reference numeral 1 designates a storage battery box adapted to contain a plurality of cells and hold them in position by a grid cell frame 2. 3 designates a storage battery cell jar of insulating material, for example, rubber, in which are arranged in the usual way the positive plates 4 and the negative plates 5, with separators between them.

The positive plates 4 have their terminals connected to a strap 6, which supports a post 7. The negative plates 5 are connected to a strap 8 which supports a negative post 9. The straps are spaced apart to provide a space 10 and the posts 7 and 9 may be connected to complementary posts by buss bars 11 and 12.

The construction thus far described is the conventional type of storage battery, it being understood, of course, that there is electrolyte in the cells.

My invention contemplates a cell cover of novel construction. The cell cover is provided with an inverted, trough-shaped, transversely disposed member 13, open at the bottom, to provide chambers 14 and 15, the bottom edges of which rest upon the straps 6 and 8 and between the straps 6 and 8 are depending flanges or side walls 16 and 17, which extend from the top 18 of the cover to the top edges of the plates 4 and 5 and as they extend across the plates 4 and 5, their bottom edges constitute separator guards, that is, they serve to prevent the separators from floating in the electrolyte and thereby hold them in their proper co-operative positions with respect to the plates 4 and 5.

The side walls 16 and 17 constitute the side walls of a gas relieving chamber 20, having a floor wall 21 in which is a threaded collar 22, the opening of which aligns with the filler opening 23 in the top 18. The side walls 16 and 17 are provided with gas escape ports 24 and 24' whereby the gas formed in the cell may pass through the ports 24 and 24' into the chamber 20 and escape through the inclined ports 25 in the filler tube plug 26. The filler tube plug has a knurled head 27 at its upper end provided with a flange or collar 28 adapted to rest upon a gasket 29 supported by the top 18 and surrounding the filler opening 23.

The lower end of the plug 26 is threaded, as at 30, to engage the threads of the collar 22 so that normally the filler tube opening will be closed when the plug is screwed into the collar 22 so that the flange 28 bears upon the gasket or washer 29.

It will be observed by reference to Fig. 1 that when the plug is in its closing position, the outlets of the ports 25 are open to atmosphere so that the gas generated in the cell may pass through the ports 24 and 24' into the chamber 20 and out to atmosphere through the ports 25.

When it is desired to fill or replenish the battery, the plug is unscrewed from the collar 22 and since the opening of the collar 22 is in line with the filler tube opening 23, it is obvious that liquid may be introduced into the battery cell through the aligning openings without removing the cover.

The cover rests upon the straps 6 and 8 and it is provided with post openings 31 and 32, through which the posts 7 and 9 may project to be connected to the buss bars 11 and 12.

By reference to the drawings, it will be apparent that the combined cell cover, filler tube, gas relieving device and separator positioner may be constructed of two pieces, the cover proper with its integral appurtenances and the removable plug 26.

When the cover is in place and the buss bars are secured to the terminal posts 7 and 9, liability of the cover having relative play with respect to the rest of the battery will be prevented and since the cover is provided with a peripheral flange 33 which extends around its lower edge to rest upon the straps 6 and 8 and since the grid frame 2 will rest upon the upper face of the flange, it will be apparent that liability of the cover having movement will be eliminated.

In actual practice when the cover is in the position shown in Fig. 1 and it is desired to fill or replenish the battery or introduce the electrolyte into the cell, it will be only necessary to take out the plug 26 and introduce the liquid. Then the plug can be secured in place and the battery will be ready for use.

The floor portion 21 not only serves as a support for the collar to hold the plug in place but it also acts as a splash guard so that liability of the electrolyte splashing out of the battery will be entirely eliminated. Indeed, there will be very little liability of the electrolyte being splashed out of the cell but in the event that it should splash into the chamber 20, it will immediately run back into the cell through the openings 24 and 24'. It cannot splash out of the cell because the plug seals the cover through the medium of the gasket 29. Therefore, liability of the electrolyte splashing around the terminal posts 7 and 9 so as to cause corrosion or to eat away the connections between the buss bars and the posts will be entirely avoided.

Obviously the device can be readily applied on existing batteries in a most convenient manner and it may be easily constructed and inexpensive to manufacture.

What I claim and desire to secure by Letters-Patent is:

1. A cell cover for storage batteries comprising an inverted, trough-shaped body portion having spaced, transverse partition walls extending below the body portion to provide separator positioning means, the partition walls being connected intermediate their ends by a floor wall below gas openings in the partition walls, a collar formed in the floor wall having an opening surrounded by a threaded collar, the opening aligning with a filler opening in the top of the trough-shaped portion, and a plug having its lower end threaded to engage the threads in the collar and having gas escape conduits, the inlets of which are below the top of the trough-shaped portion and the outlets of which are above the top of the trough-shaped portion, the plug being effective in closing the filler opening in the trough-shaped portion.

2. A cell cover for storage batteries comprising an inverted, trough-shaped body portion having spaced, transverse partition walls extending below the body portion to provide separator positioning means, the partition walls being connected intermediate their ends by a floor wall below gas openings in the partition walls, a collar formed in the floor wall having an opening surrounded by a threaded collar, the opening aligning with a filler opening in the top of the trough-shaped portion, and a plug having its lower end threaded to engage the threads in the collar and having gas escape conduits, the inlets of which are below the top of the trough-shaped portion and the outlets of which are above the top of the trough-shaped portion, the plug being effective in closing the filler opening in the trough-shaped portion, the trough-shaped portion having storage battery post openings on opposite sides of the partition walls.

3. A cell cover for storage batteries comprising an inverted, trough-shaped member having transverse partitions to form a central chamber, the partitions being provided with gas openings, the top of the cover having a filler opening, and a plug for closing the filler opening having a flange for overlapping the edges of the opening and provided with diagonal gas escape ports communicating with the chamber between the partitions and with atmosphere.

4. A storage battery cell cover comprising an inverted, trough-shaped member having depending, transverse partitions extending from the top of the trough-shaped member to a point below the same, a horizontal wall connecting the transverse partitions below the trough-shaped member and having a collar therein, the opening of which aligns with an opening in the top of the trough-shaped member, and a plug adapted to extend through the opening in the trough-shaped member and engage the collar to rigidly connect it thereto so that the plug will close the opening in the trough shaped member, the plug having diagonal escape ports communicating with the trough-shaped member and with atmosphere and the partitions having openings to communicate with the storage battery cell and with the spaces between the transverse partitions.

5. A cell cover comprising an inverted, trough-shaped member having a central filler opening and post openings on either side thereof, depending transverse partitions carried by the top of the inverted, trough-shaped member and dividing the trough-shaped member into a central chamber and two end chambers, the end chambers having the post openings and the partitions having transverse gas passages, an internally threaded collar supported by the transverse partitions, the opening of which is in line with the central opening of the trough-shaped member, and a plug having a collar to overlap the edges of the central opening of the trough-shaped member and having threads on its lower end to engage the threads of the collar, the plug having gas escape openings communicating with the spaces between the transverse partitions and with atmosphere.

In testimony whereof I affix my signature.

EARLE A. BERRY.